United States Patent [19]

Takahashi et al.

[11] Patent Number: 5,339,302
[45] Date of Patent: Aug. 16, 1994

[54] RF SIGNAL-COMPENSATED SYSTEM FOR READING AN OPTICAL DISC PLAYER WITH AN ABSOLUTE TIME DETECTOR

[75] Inventors: Hiroyuki Takahashi; Shinichi Nagahara, both of Saitama, Japan

[73] Assignee: Pioneer Electronic Corporation, Tokyo, Japan

[21] Appl. No.: 966,916

[22] Filed: Oct. 27, 1992

[30] Foreign Application Priority Data

Oct. 31, 1991 [JP] Japan .................................. 3-313554

[51] Int. Cl.$^5$ .............................................. G11B 7/00
[52] U.S. Cl. .................... 369/54; 369/44.13; 369/44.36; 369/58; 369/109; 369/124
[58] Field of Search ............... 369/44.13, 44.29, 44.35, 369/44.36, 109, 111, 124, 47–48, 54, 58

[56] References Cited

U.S. PATENT DOCUMENTS

| | | | |
|---|---|---|---|
| 4,691,308 | 9/1987 | Takagi et al. | 369/124 |
| 4,847,824 | 7/1989 | Davie | 369/124 |
| 5,050,151 | 9/1991 | Kurz | 369/44.29 |

*Primary Examiner*—W. R. Young
*Attorney, Agent, or Firm*—Nikaido, Marmelstein, Murray & Oram

[57] ABSTRACT

A reading system of an optical disc has a pregroove having a wobbled inside wall and pits for representing recorded data, and a pair of photodetector elements for detecting a spot of a laser beam reflected on the optical disc. The wobbled inside wall is modulated so as to represent absolute time. A differential amplifier is provided for deriving the difference between outputs of photodetector elements. A gain variable amplifier is provided for adjusting the level of one of the outputs to the level of the other output, so that the difference becomes zero.

4 Claims, 5 Drawing Sheets

FIG.3 a OUTPUT OF PD₁

FIG.3 b OUTPUT OF PD₂ / OUTPUT OF PD₂ AFTER ADJUSTING GAIN

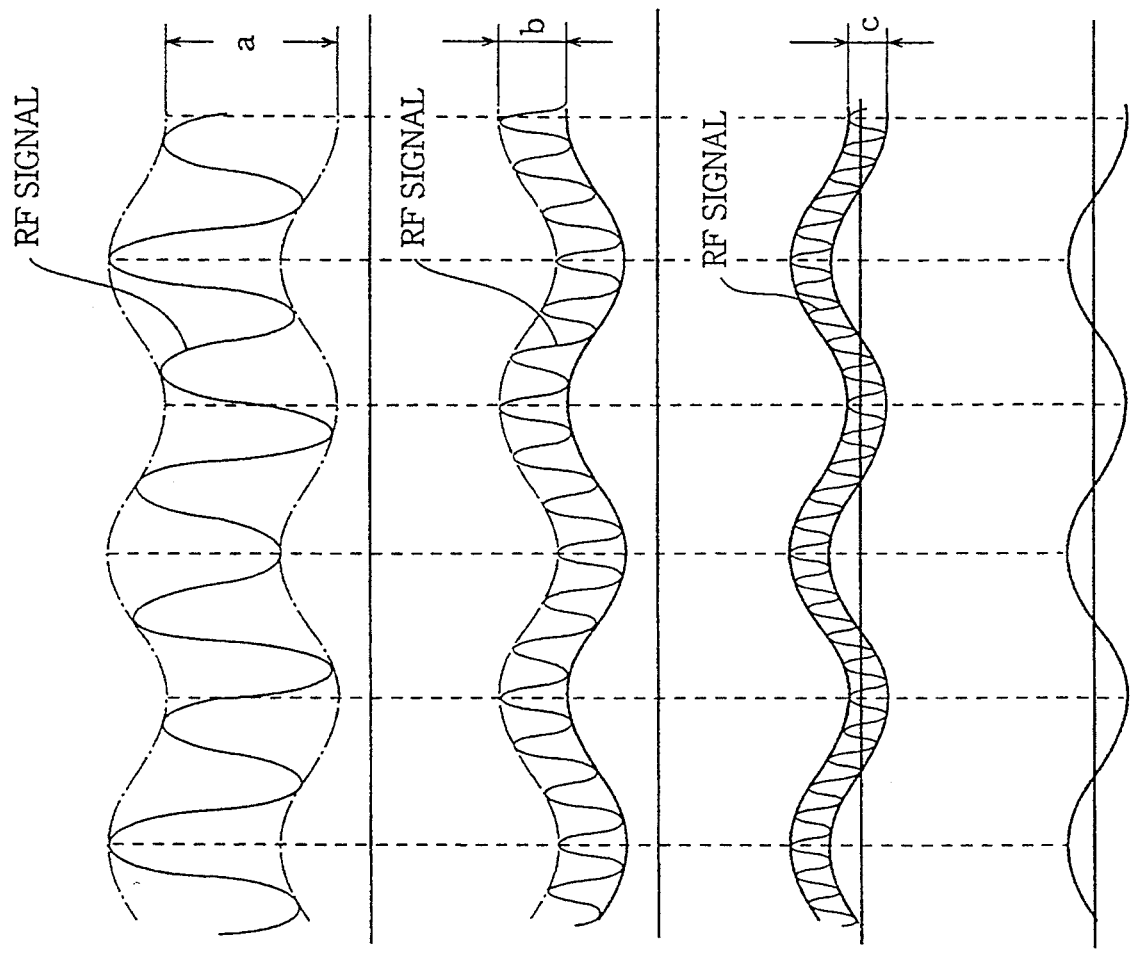

RF SIGNAL-COMPENSATED SYSTEM FOR READING AN OPTICAL DISC PLAYER WITH AN ABSOLUTE TIME DETECTOR

BACKGROUND OF THE INVENTION

The present invention relates to a reading system provided in a tracking servo system using a push-pull method in an optical disc player, and more particularly to a system for reading data recorded on an optical disc in the form of a wobbling groove.

At present, write once discs and erasable discs are available for use as writable optical discs having a high recording density. Information is recorded on the disc and reproduced with a laser beam. These discs are different from the CD in the material of the recording surface.

For example, the write once (CD-WO) disc has a tellurium or bismuth recording surface on which the lasers burn pits for recording. In another type of the CD-WO discs, the lasers are focused on a recording surface coated with a selenium antimony ($Sb_2Se_3$) thin film, or an oxide tellurium (TeOx) thin film, or a thin film of organic pigment, changing the reflectivity of the light.

The erasable disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling the information to be read.

The CD-WO disc has a pregroove which is formed on the recording surface in a spiral and parallel with the track of recorded data. The pregroove has a wobbled inside wall. The wobbling waves are modulated in frequency for representing absolute time, so that the position of the data on the disc may be indicated. FIG. 4 shows a CD-WO disc 1 with a pregroove 2 having a wobbled inside wall. In order to increase the recording density in the radial direction of the disc, pits 3 for representing recorded data are formed in the pregroove 2.

The pitch of the pregroove 2 is about 1.6 μm. The width of the pregroove 2 is 0.45 μm and the depth thereof is 0.1 μm.

The surface of the disc 1 is coated with a thin film of pigment. The laser beam is focused on the surface to convert the beam into thermal energy, so that the nature of the thin film in the groove is changed, thereby forming the pits 3 thereon. Thus, data is recorded in the groove of the disc by laser beam. The information recorded on the disc 1 is reproduced in accordance with the difference of the quantity of reflected light between the pit and an unrecorded portion.

FIG. 5 shows a conventional absolute time reading device provided in a tracking servo system using the push-pull method. The system has a photodetector 4 for detecting the spot of the reflected beams. The photodetector 4 has two detector elements PD1 and PD2 which are defined by a central boundary line 4a in the tangential direction of the disc. The reflected beam forms a shadow by a hatched area in FIG. 5 on each of the detector elements PD1 and PD2.

The push-pull method is one of the methods for deriving a tracking error signal. Referring to FIGS. 6a to 6c, the push-pull method uses change in distribution of energy in a beam spot which is caused by light diffracted and reflected by the pit 3 on the disc 1 when a laser beam is deflected from a track of the disc. When the laser beam is properly centralized on the track, the light is equally diffracted to the right and the left as shown in FIG. 6b. Thus energy is equally distributed. On the other hand, if the tracking is off-center as shown in FIGS. 6a and 6c, the reflected beams are asystemmetrically diffracted. By obtaining the difference between the distributions of energy, the direction in which the beam is deflected from the track can be determined.

If the track on the disc is properly followed, diffracting the beam as shown in FIG. 6b, the shadows formed on the detector elements PD1 and PD2 have the same area so that the difference therebetween is zero. If the beam is deflected to the left of the pit, thereby giving a diffraction shown in FIG. 6a, the shadow on the detector element PD1 is smaller than the shadow on the detector element PD2. To the contrary, if the beam is deflected to the right, so that the beam diffracts as shown in FIG. 6c, the shadow on the element PD2 becomes smaller than the shadow on the element PD1.

Each of the detector elements PD1 and PD2 produces an output representing the area of the shadow. The outputs are fed to a differential amplifier 5 which generates a positive or negative tracking error signal based on the difference between the outputs. The tracking error signal is applied to a tracking servo 6, thereby operating an actuator 7 to move an optical pickup so as to cause the difference to go to zero. The outputs of the detector elements PD1 and PD2 are further applied to a summing amplifier 9 to produce an RF signal.

In order to detect the absolute time on the disc 1, an absolute time decoder 8 is provided for receiving the tracking error signal from the differential amplifier 5. The tracking error includes the wobbling signal dependent on the wobbling of the pregroove. Since the wobbling signal is frequency-modulated, the absolute time can be detected from the tracking error signal.

In the push-pull method, when the axis of the laser beam is not vertical to the recording surface of the disc, or the objective is moved, or the axis of the laser beam is deflected, the spot of the reflected beam is deflected in the direction perpendicular to the center line 4a. Consequently, the distribution of the energy of the spot received by the detector elements PD1 and PD2 fluctuates, thereby causing the tracking error signal to have a DC offset. Therefore, as shown in FIG. 7a and 7b, the level of an RF signal in the output a from a detector element PD1 is different from the level of an RF signal in the output b from the detector element PD2. Hence an RF signal c (a-b) shown in FIG. 7c remains in the output of the differential amplifier 5. Since the output having the RF signal c is applied to the absolute time decoder 8 and the RF signal acts as noise, a desired absolute time signal shown in FIG. 7d is not obtained at the decoder 8.

SUMMARY OF THE INVENTION

An object of the present invention is to provide a reading system which may exactly obtain the information of absolute time even if the spot of the reflected beam is deflected.

According to the present invention, there is provided a reading system of an optical disc having a spiral groove having a wobbled inside wall and pits for representing recorded data, and a pair of photodetector elements for detecting a spot of a laser beam reflected on the optical disc.

The system comprises means for deriving the difference between outputs of the photodetector elements, and means for adjusting the level of at least one of the outputs to the level of the other output, so that the difference becomes zero.

In one aspect of the present invention, the deriving means is a differential amplifier, and the adjusting means is a gain variable amplifier.

The other objects and features of this invention will become understood from the following description with reference to the accompanying drawings.

BRIEF DESCRIPTION OF DRAWINGS

FIGS. 7a to 7d show output signals of a photodetector for explaining an operation of the conventional reading device.

DETAILED DESCRIPTION OF THE PREFERRED EMBODIMENT

Figure 1:
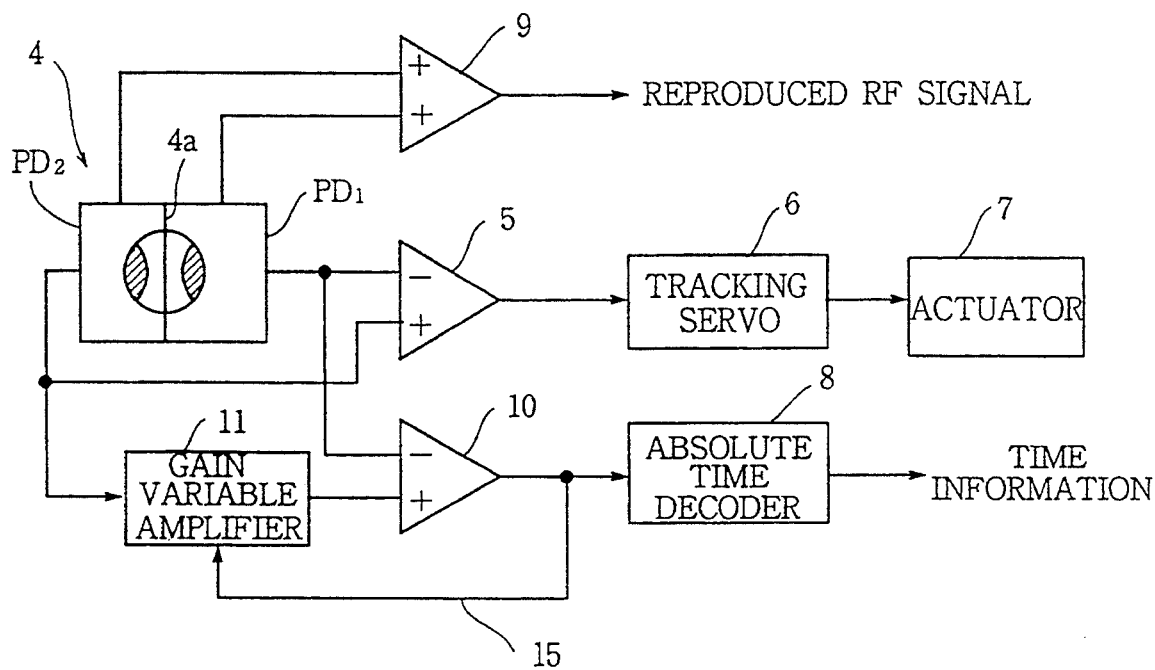
FIG. 1 is a block diagram of a tracking servo system having an absolute time reading device according to the present invention.
Figure 5:
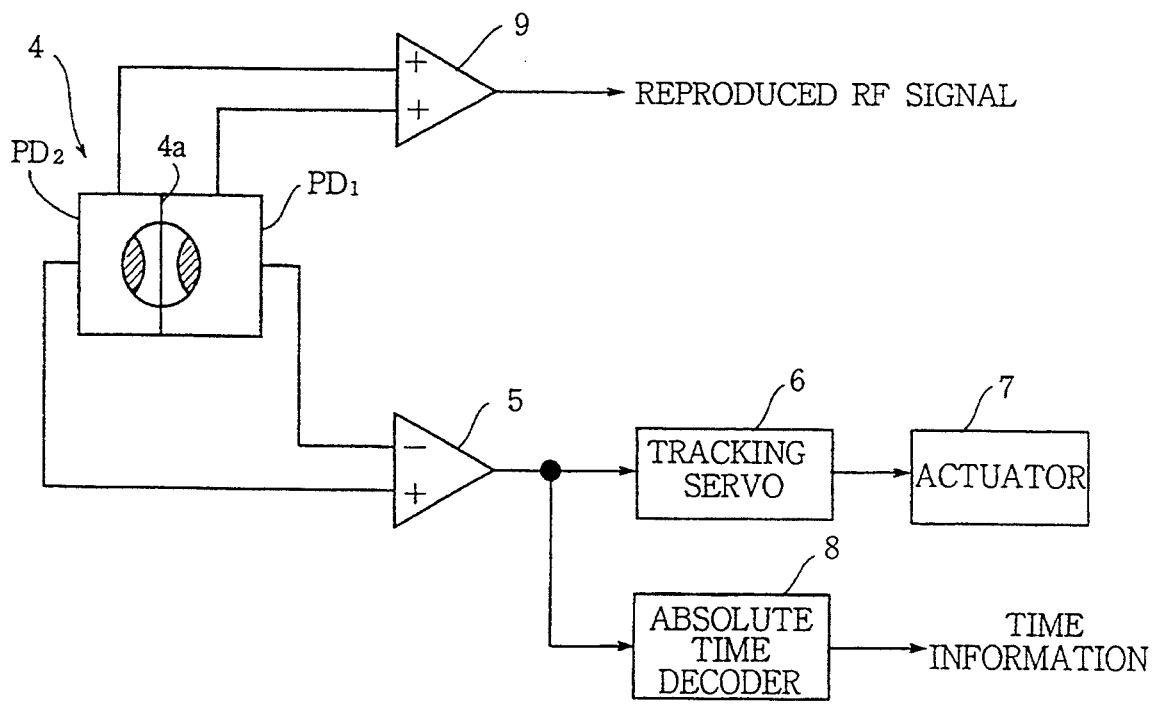
FIG. 5 is a block diagram of a tracking servo system having a conventional reading device.
Figure 6:
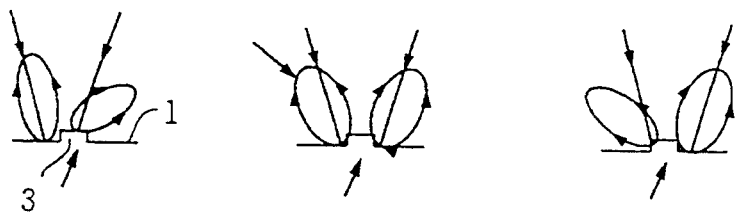
FIGS. 6a to 6c are diagrams for explaining the principle for deriving a tracking error signal in accordance with the push-pull method.

Referring to FIG. 1, a tracking servo system to which the present invention is applied has a differential amplifier 10 for deriving the tracking error signal. In FIG. 1, the same parts as in FIG. 5 are designated with the same reference numerals.

The output of the detector element PD1 of the photodetector 4 is applied to an inverting input terminal of the amplifier 10. The output of the detector element PD2 is applied to a noninventing input terminal of the amplifier 10 through a gain variable amplifier 11 the gain of which can be changed. The differential amplifier 10 generates an output signal based on the difference between the outputs of the detector elements PD1 and PD2. The output signal is applied to the absolute time decoder 8 and fed back to the amplifier 11 through a feedback loop 15.

Figure 2:
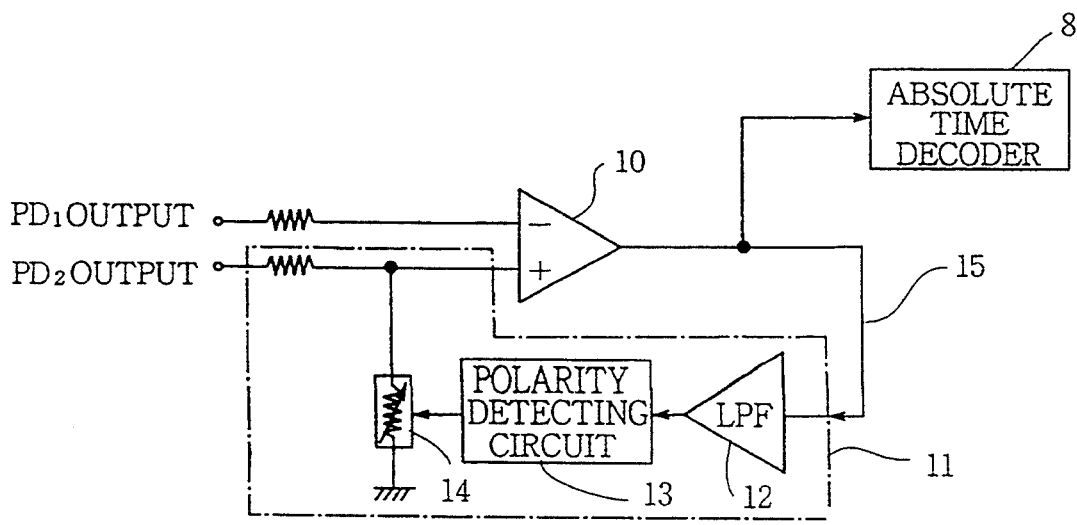
FIG. 2 shows a circuit of a gain variable amplifier provided in the reading device.

Referring to FIG. 2, the gain variable amplifier 11 comprises an LPF 12 applied with the output signal of the amplifier 10 for removing noises from the signal, a polarity detecting circuit 13 for detecting the polarity of the signal, and a variable resistor 14 for changing the gain of the amplifier. If the circuit 13 detects that the output signal is positive, the resistance of the resistor 14 is changed to reduce the value thereof. The circuit 13 operates such that the value of the resistor 14 is changed so as to coincide the output of the detector element PD2 to be applied to the amplifier 10 with the output of the detector element PD1 in accordance with the output of the amplifier 10.

Figure 3:
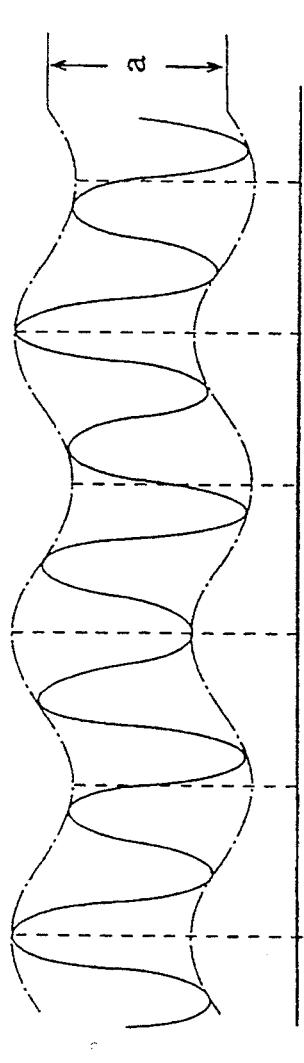
FIGS. 3a to 3c show output signals of a photodetector and corrected signals at the reading device according to the present invention.
Figure 3:
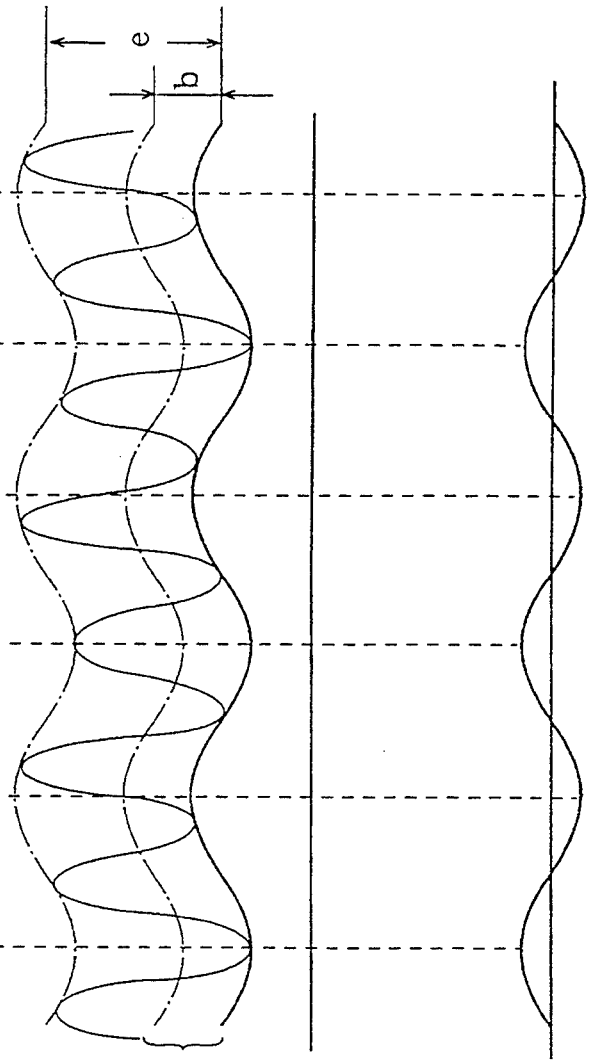
Figure 4:
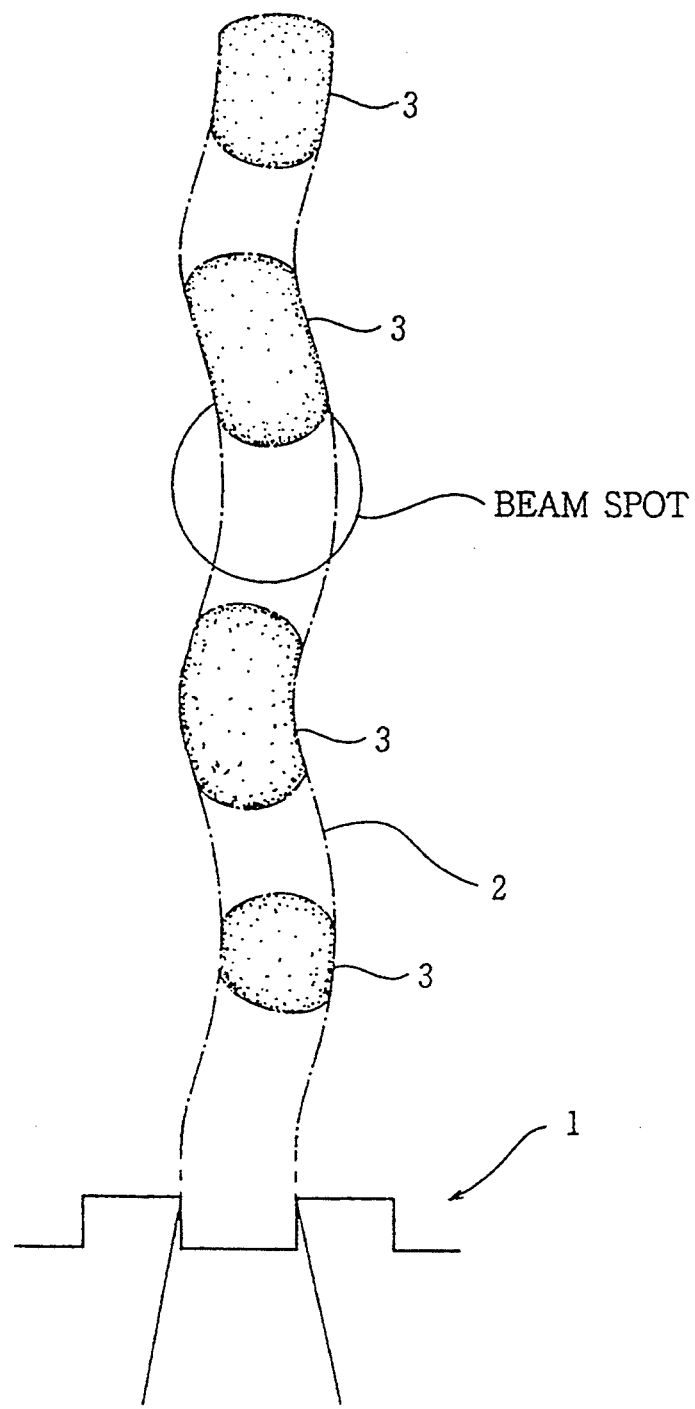
FIG. 4 is a schematic illustration showing an optical disc of the present invention.

In operation, if the axis of the laser beam is tilted with respect to the recording surface of the disc, the outputs a and b of the detector elements PD1 and PD2 are different from each other as shown in FIGS. 3a and 3b. In this state, the polarity of the output signal of the amplifier 10 is negative, since the output voltage of the detector element PD2 is lower than that of the detector element PD1. The polarity and the voltage to be adjusted are detected by the circuit 13. Thus, the resistance of the resistor 14 is changed to increase the output voltage of the detector element PD2. Thus, the output b of the element PD2 is increased to coincide with the output a of the element PD1 as shown by an output e in FIG. 3b. Consequently, the amplifier 10 generates an output signal without an RF signal as shown in FIG. 3c. The decoder 8 decodes the absolute time with accuracy from the output signal without an RF signal.

Alternatively, the output of the detector element PD1 may be controlled to coincide with the output of the detector element PD2, or both of the outputs may be controlled to coincide with each other.

In accordance with the present invention, the reading system is provided with a device for controlling the output of the divided detector element of the photodetector when the tracking error signal is produced. Since one of the outputs is controlled to coincide with the other output, the RF signal is canceled. Thus, the noise caused by the RF signal is eliminated, thereby decoding the absolute time with accuracy.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A reading system for an optical disc having a spiral groove with a wobbled inside wall and pits for representing recorded data, and a pair of photodetector elements for detecting a spot of a laser beam reflected on the optical disc, the system comprising:

differential amplifier means connected to said photodetector elements, for deriving a difference between outputs of said photodetector elements;

means for adjusting a level of at least one of the outputs to a level of the other output, so that said difference becomes zero, wherein said differential amplifier means produces a wobbled signal without an RF signal; and absolute time detecting means for detecting an absolute time from the wobbled signal.

2. A system according to claim 1, wherein the adjusting means is a gain variable amplifier.

3. An absolute time detecting device in a reading system for an optical disc having a spiral groove with a wobbled inside wall and pits for representing recorded data, the reading system including first and second photodetector elements for detecting diffraction levels of a spot of a laser beam reflected on the optical disc, wherein each of said first and second photodetector elements is connected to output first and second signals, respectively, representing the diffraction levels of the laser beam reflected on the optical disc, the device comprising:

differential amplifier means connected to the first and second photodetector elements, for deriving a difference between the first and second signals of said first and second photodetector elements, and for generating a wobbled signal based on the difference between the first and second signals;

means for adjusting a level of at least the first signal from said first photodetector element to a level of the second signal from said second photodetector element, so that said difference becomes zero, wherein said differential amplifier means generates the wobbled signal without an RF signal; and absolute time decoder means connected to said differential amplifier means, for deriving an absolute time signal based on the wobbled signal.

4. An absolute time detecting device according to claim 3, wherein said adjusting means includes a gain variable amplifier.

* * * * *